United States Patent
Ko et al.

(10) Patent No.: US 8,076,905 B2
(45) Date of Patent: Dec. 13, 2011

(54) BATTERY CHARGING METHOD AND DEVICE THEREOF

(75) Inventors: Hui Pin Ko, Taipei Hsien (TW); Kuan-Chi Juan, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 816 days.

(21) Appl. No.: 12/218,826

(22) Filed: Jul. 18, 2008

(65) Prior Publication Data

US 2009/0096428 A1    Apr. 16, 2009

(30) Foreign Application Priority Data

Oct. 12, 2007  (TW) ............................... 96138377 A
Jan. 21, 2008  (TW) ............................... 97102257 A (51) Int. Cl.
*H01M 10/44* (2006.01)
*H01M 10/46* (2006.01)

(52) U.S. Cl. ....................... 320/134; 320/160
(58) Field of Classification Search .................. 320/107, 320/116, 128, 130, 134, 136, 160
See application file for complete search history.

(56) References Cited

U.S. PATENT DOCUMENTS

| | | | |
|---|---|---|---|
| 5,804,944 A * | 9/1998 | Alberkrack et al. | 320/163 |
| 6,456,042 B1 * | 9/2002 | Kwok | 320/134 |
| 7,081,737 B2 * | 7/2006 | Liu et al. | 320/130 |
| 2006/0091858 A1 * | 5/2006 | Johnson et al. | 320/128 |

* cited by examiner

*Primary Examiner* — Edward Tso
(74) *Attorney, Agent, or Firm* — Hudak, Shunk & Farine Co. LPA (57) ABSTRACT

A battery charging method and device thereof are disclosed. The method includes the following steps. First, a charging current is supplied into a plurality of cell blocks of a battery module for charging, and the terminal voltages of the cell blocks are detected, when one of said terminal voltages exceeds a first threshold, the charging is kept continuously over a first preset time period. If one of said terminal voltages of said cell blocks exceeds a second threshold, an over voltage protection is performed, else the charging current is reduced and the battery module is charged by the reduced charging current continuously over a second preset time period and if the cell blocks are determined that they are fully charged, the charging is stopped, otherwise, the battery module is charged continuously. Therefore, the battery charging method and device thereof in accordance with the present invention can prevent the battery module from being overcharged and prolong its life.

18 Claims, 8 Drawing Sheets

BATTERY CHARGING METHOD AND DEVICE THEREOF

FIELD OF THE INVENTION

The invention relates a battery charging method and device thereof, and more particularly to a battery charging method and device capable of retarding deterioration of the battery.

BACKGROUND OF THE INVENTION

As the technology grows and advances rapidly, the battery becomes an electrical power source which is not considerably replaceable and been extensively used for devices as MP3 player, cellular phone, notebook computer, electric vehicle and the likes. Therefore, a variety of charging means for battery have been proposed, such as "Constant Trickle Current Charge", "Constant Current Charge", "Constant Current Constant Voltage Charge" and "Two-Step Charging", etc.

Figure 1A:
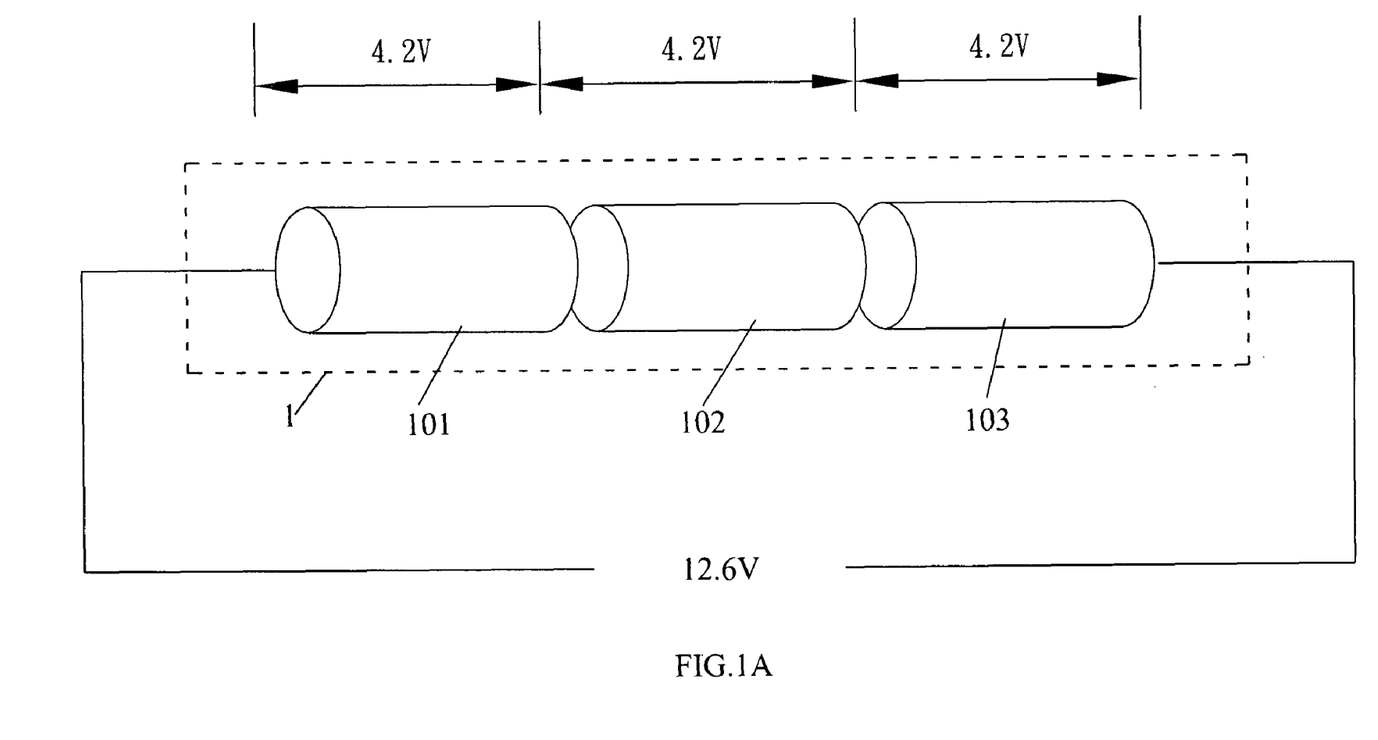
FIG. 1A is a schematic view of voltage distribution in accordance with a battery module having a plurality of normal cell blocks.
Figure 1B:
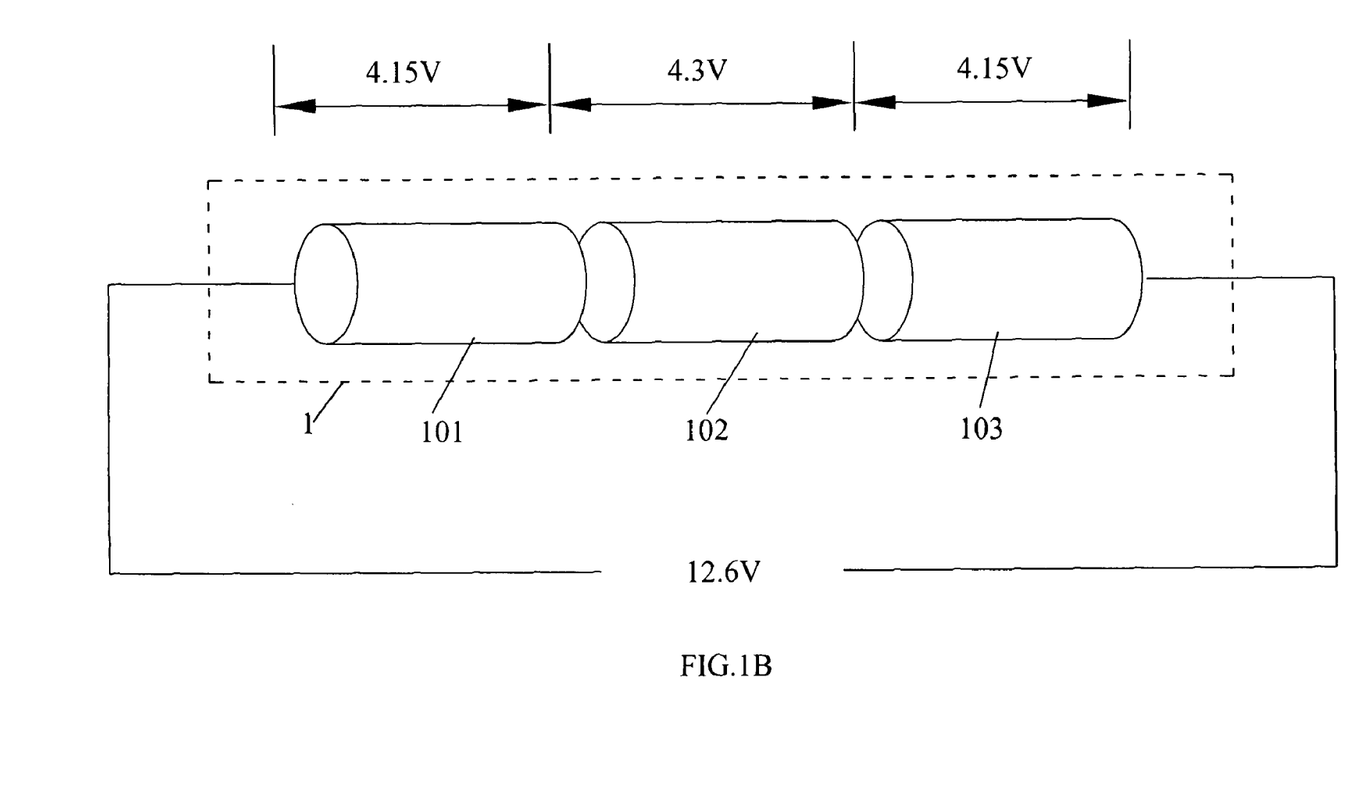
FIG. 1B is a schematic view of voltage distribution in accordance with a battery module having a plurality of deteriorated cell blocks.

Battery aging is known as a very important topic in battery technology. A deteriorated battery not only causes lower storage capacity and low usage efficiency, but also creates a significantly risk due to the overcharging of the cell blocks, since the terminal voltage difference of normal cell blocks is normally greater than normal cell blocks during charging operation. FIGS. 1A and 1B illustrates a schematic view of voltage distribution in accordance with a battery module having a plurality of normal and deteriorated cell blocks respectively. In FIG. 1, since all three cell blocks 101 to 103 are normal cell blocks, so the charging voltage 12.6V are equally supplied to each one of cell blocks 101 to 103, the terminal voltage of cell blocks 101 to 103 is 4.2V respectively therefore.

When deterioration that occurs in one of the cell blocks comprised in battery module 1, for example the cell block 102, the terminal voltages of cell block 102 will greater than other normal cell blocks 101 and 103 during charging. As shown in FIG. 1B, the terminal voltage of deteriorated cell block 102 is 4.3V and terminal voltages of normal cell block 101 and 103 are 4.15V respectively. Hence if cell block 102 remains deteriorated, the terminal voltage of cell block 102 would increase accordingly and may result in hazardous explosion by cell block 102.

In order to ensure the battery module fully charged, the conventional charging method typically supplies the charging voltage exceeding the safety load limit of the battery module, resulting in deteriorated scenario of the cell blocks after a long term period. Besides, though the battery module equips both over voltage protection as well as over current protection mechanisms, such mechanisms are designed for entire battery module, it is not able to reduce the risk caused by a single deteriorated cell block.

In view of the drawbacks of the prior art, the inventor of the present invention based on years of experience in the related industry to conduct extensive researches and experiments, and finally developed a charging method and device in accordance with the present invention to overcome the drawbacks of the prior art.

SUMMARY OF THE INVENTION

Therefore, one of objectives of the present invention is to provide a battery charging method and device thereof to charge battery module safer and retard deterioration of the battery.

To achieve the foregoing objective, the present invention provides a battery charging method including the steps of:

(i) supplying a charging current into a battery module having a plurality of cell blocks for charging;
(ii) detecting the terminal voltages of said cell blocks;
(iii) continuously charging over a first preset time period if one of said terminal voltages exceeds a first threshold, and then determining whether or not one of said terminal voltages of the cell blocks exceeds a second threshold, and performing step (iv) if one of the terminal voltages of said cell blocks exceeds the second threshold, otherwise performing step (v);
(iv) performing an over voltage protection; and
(v) determining whether or not said cell blocks are fully charged, and stopping charging if said cell blocks are fully charged, otherwise performing step (i).

Besides, the present invention further provides a battery charging method including the steps of:

(a) supplying a charging current into a battery module having a plurality of cell blocks for charging;
(b) detecting the terminal voltages of the cell blocks;
(c) continuously charging over a first preset time period when one of the terminal voltages exceeds a first threshold;
(c') determining whether or not one of said terminal voltages of said cell blocks exceeds a second threshold, and performing step (d) if one of said terminal voltages of the cell blocks exceeds said second threshold, otherwise, performing step (e);
(d) performing an over voltage protection; and
(e) determining whether or not said cell blocks are fully charged, and stopping charging if said cell blocks are determined being fully charged, otherwise, performing step (c').

Besides, the present invention further provides a battery charging method including the steps of:

(A) supplying a charging current into a battery module having a plurality of cell blocks for charging;
(B) detecting the terminal voltages of the cell blocks;
(C) continuously charging over a first preset time period when one of said terminal voltages exceeds a first threshold, and determining whether or not one of the terminal voltages of said cell blocks exceeds a second threshold, and performing step (D) if one of the terminal voltages of said cell blocks exceeds a second threshold, otherwise performing step (E);
(D) performing an over voltage protection;
(E) reducing the charging current and continuously supplying reduce charging current over a second preset time period; and
(F) determining whether or not said cell-blocks are fully charged, and stopping charging if said cell-blocks are determined being fully charged; otherwise, performing step (A).

Besides, the present invention further provides a battery charging method including the steps of:

(1) supplying a charging current into a battery module having a plurality of cell blocks for charging;
(2) detecting the terminal voltages of the cell blocks;
(3) continuously charging over a first preset time period when one of the terminal voltages exceeds a first threshold, and then determining whether or not one of said terminal voltages of the cell blocks exceeds a second threshold, and performing step (4) if one of the terminal voltages of the cell blocks exceeds a second threshold, otherwise, performing step (5);
(4) performing an over voltage protection;
(5) reducing the charging current and continuously supplying reduced charging current over a second preset time period; and
(6) determining whether or not the cell-blocks are fully charged, and stopping charging if the cell-blocks are determined being fully charged, otherwise, performing step (3).

Besides, the present invention further provides a battery charging device, applied for a battery module having a plurality of cell blocks. The battery charging device comprising a charging module for supplying a charging current into said cell blocks; an over voltage protection module for providing an over voltage protection function to the cell blocks; and a control module for detecting the terminal voltages of the cell blocks, when one of said terminal voltages exceeds a first threshold, said control module continuously supplying the charging current into the battery module over a first preset time period, and then determining whether or not one of the terminal voltages of the cell blocks exceeds a second threshold.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

DETAILED DESCRIPTION OF THE PREFERRED EMBODIMENTS

To make it easier for our examiner to understand the objective of the invention, its structure innovative features, and performance, we use embodiments together with the attached drawings for detailed description, and the use of the same reference symbols in different drawings indicates similar or identical items.

Figure 2:
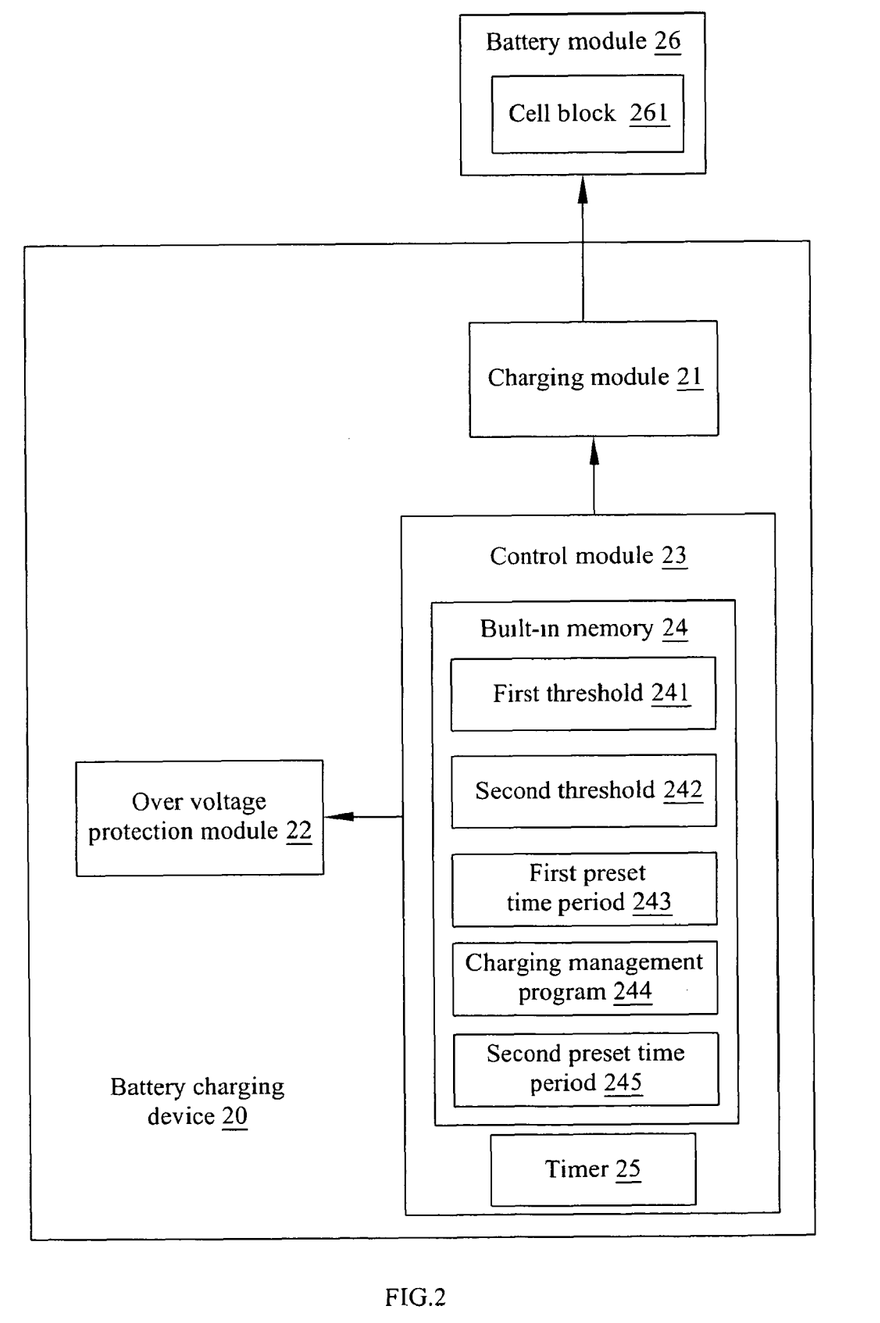
FIG. 2 illustrates a block diagram of an embodiment of the battery charging device in accordance with the present invention.

FIG. 2 illustrates a block diagram of an embodiment of the battery charging device in accordance with the present invention. As illustrated, a charging device 20 applied for a battery module 26 having a plurality of cell blocks 261, comprises a charging module 21, an over voltage protection module 22 and a control module 23. The charging module 21 is for supplying a charging current into the cell blocks 261, and the over voltage protection module 22 is for providing an over voltage protection function to the cell blocks 261 of the battery module 26. Preferably, the charging device 20 further can comprise an built-in memory 24 for storing a first threshold 241, a second threshold 242, a third threshold 243, a first preset time period 243 and a second preset time period 245.

The control module 23 is operable to detect the terminal voltages of the cell blocks 261. When one of the detected terminal voltages exceeds a first threshold 241, the control module 23 allows the charging module 21 continuously charging the cell blocks 261 over a first preset time period 243, and then determines whether or not one of the terminal voltages of the cell blocks 261 exceeds a second threshold 242, if yes, it indicates that at least one of cell blocks 261 is deteriorated cell block, thus the control module 23 enables over voltage protection module 22 to perform an over voltage protection function, otherwise, the control module 23 controls the charging module 21 to reduce the charging current and continuously supplies the reduced charging current to cell blocks 261 over a second preset time period 245.

For example, the charging current can be reduced by half each time, and each reduced charging current is used to charge the battery module 26 for the second preset time period 245.

In this embodiment, the control module 23 further can comprise a counter 25 for calculating the aforementioned preset time periods. The control module 23 performs the aforementioned charging procedure by executing a charging management program 244. Preferably, the built-in memory 24 can be implemented using a ROM or a RAM, for storing the first threshold 241, the second threshold 242, the third threshold 243, the first preset time period 244 and the second preset time period 245. The counter 25 can be implemented by hardware.

Figure 3:
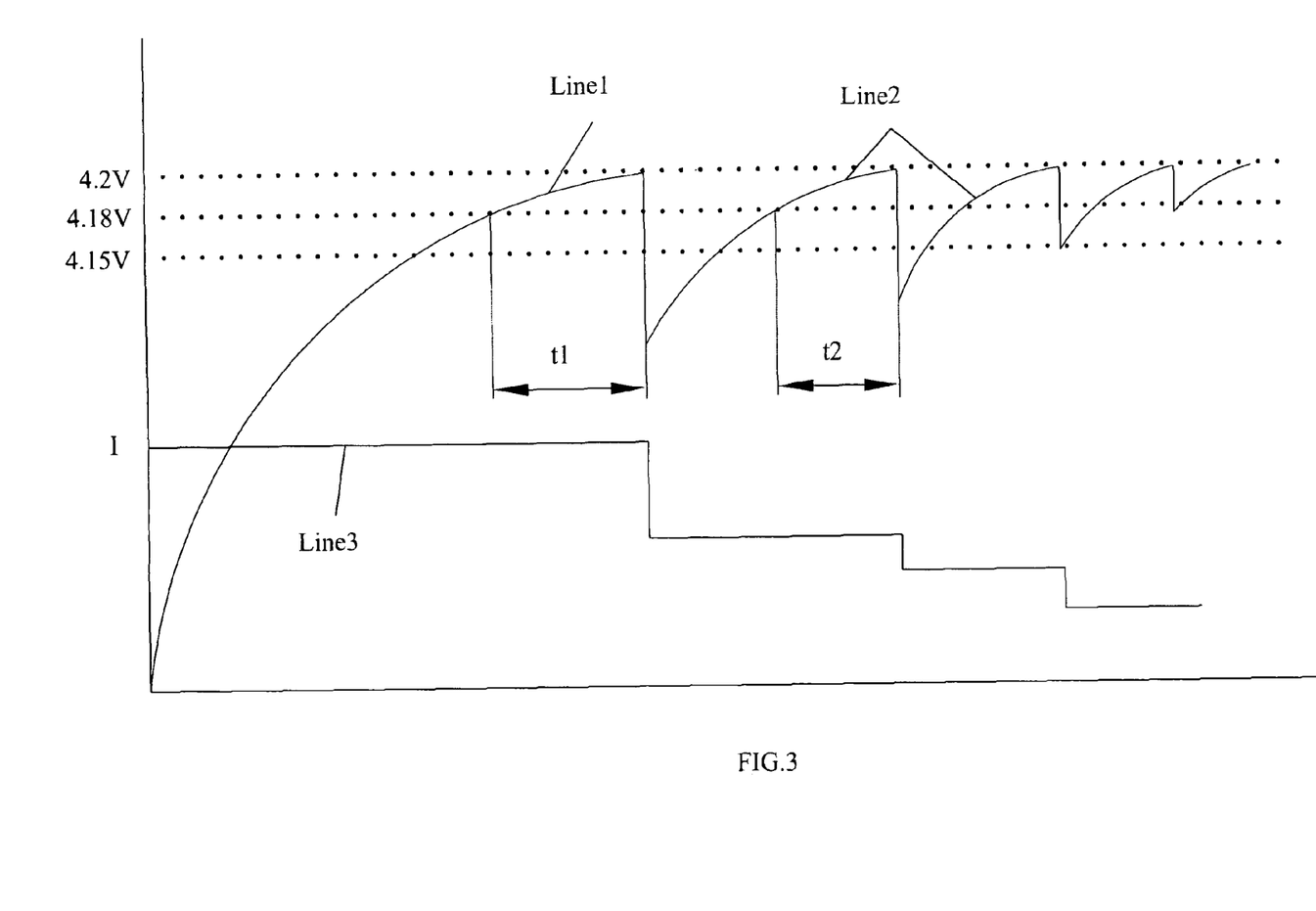
FIG. 3 is a schematic waveform diagram of charging voltage and charging current of the battery charging device in accordance with the present invention.

FIG. 3 illustrates a schematic waveform diagram of charging voltage and charging current of the battery charging device in accordance with the present invention, which is the decreasing charging current waveform and voltage waveform when cell blocks 21 shown in FIG. 2 is charged. The voltage value in which the cell block 21 is fully charged is defined as 4.2V. In FIG. 3, line 1 is the waveform when the cell blocks 261 starts being charged. Because of virtual voltage effect, even the terminal voltage of cell block 261 has reached 4.2V, it does not indicate that the cell block is full charged, and the terminal voltage of cell block 261 will decrease rapidly when the cell blocks 261 is not in use, as shown by Line 2. In the other word, the terminal voltage of the cell blocks 261 may drop below 3.6V in short-time use if no charging operation is applied thereon, namely the battery charge capacity is not fully utilized, so as to shorten the service of the battery. Hence, the conventional battery charging method ensures the usage of charge capacity of cell blocks 261 being fully utilized by using the charging voltage exceeding the safety load limit. However, using the conventional overcharging method to charge 4.3V to cell block 261 having safety limit 4.2V without essentially determining the status of cell blocks 261 would greatly reduce the service life of battery module 26 and is accelerated to deteriorate cell blocks 261.

As disclosed aforementioned, when control module 23 detects that the terminal voltages of cell blocks 261 reaches a first threshold 241 (4.18V in this embodiment), the control module 23 allows the charging module 21 continuously charging the cell blocks 261 over a first preset time period 243 (t1), then determines whether or not one of the terminal voltages of cell blocks 261 exceeds a second threshold 242 (4.22V in this embodiment). If the terminal voltage of cell block 261 is greater than 4.22V, which means that this cell block 261 is deteriorated, an aging effect may take place thereon. Typically, the terminal voltages of deteriorated cell blocks may increase rapidly rather than normal cell blocks during battery charging operation, so the condition of exceeding the second threshold 242 would occur in such a short period of time. If one of the cell blocks 21 is determined being an abnormal cell block, the over voltage protection is performed to avoid risks generated by continuously charging the deteriorated cell blocks. If the terminal voltages still fall below 4.22V after continuously charging over a first preset time period 243 (t1), which indicates that the cell blocks 261 are normal cell blocks, subsequently the control module 23 controls the charging module 21 for reducing the charging current and continuously charging cell blocks 261 over a second preset time period 245 (t2).

In this embodiment, the procedure that control module 23 controls charging module 21 for reducing charging current and continuously charging the cell blocks 261 over second preset time period 245 (t2) is disclosed below. When control module 23 reduces the charging current for cell blocks 26, the reduced charging current is used to charge the cell blocks 261 for a second preset time period 245 (t2), the input power of control module 21 is thus reduced so as to decrease the terminal voltages of cell blocks, that is, to eliminate virtual voltage effect as well as to make cell blocks 261 chemically react stable inside cell blocks 261. After the second preset time period 245 (t2), terminal voltages of the cell blocks are detected again for determining whether one of the terminal voltages is lower than a third threshold (4.15V in this embodiment), if yes, which indicates that the cell blocks 261 is not fully charged, the control module 23 will allow the charging module 21 continuously charging the cell blocks 261.

After determining the battery module having no deteriorated cell blocks and allowing the charging module 21 to continuously supply a charging current over a preset second time period 245 (t2), the control module 23 reduces the charging current of charging module 21 supplied to cell blocks 261, for example, Line 3 is the waveform curve of amplitude of the charging current, lastly, and determines again whether or not battery module 26 is fully charged. These aforementioned steps will be repeated until the cell blocks 261 being fully charged.

If the terminal voltages of cell blocks 261 are greater than a preset third threshold, which means that the cell blocks 261 are fully charged, the control module 23 would stop charging module 21 charging cell blocks 261. Preferably, the length of the first preset interval 253 (t1) ought to be considered to avoid the terminal voltages of cell block 261 being charged too high that would reduce its service life, namely, the length of the second preset interval 245 (t2) also need be considered the safety load limit of battery module 26 after charged each time, as well as to prevent the switch device of battery from switching frequently for charging.

Besides, the control module 23 can also determine whether or not cell blocks 21 is fully charged by checking the charging current supplied to cell blocks 261. Please note, it is well known to determine whether cell blocks 261 is fully charged in the prior arts, as well as the over charging protection, so that it is not necessary to explain it in detail here. It is to be understood that the example of determining whether cell blocks 261 is fully charged above is not limited to those precise embodiments, and that various other changes and modifications for determining whether cell blocks 261 is fully charged may be effected therein by one skilled in the art without departing from the scope or spirit of the invention.

Figure 4:
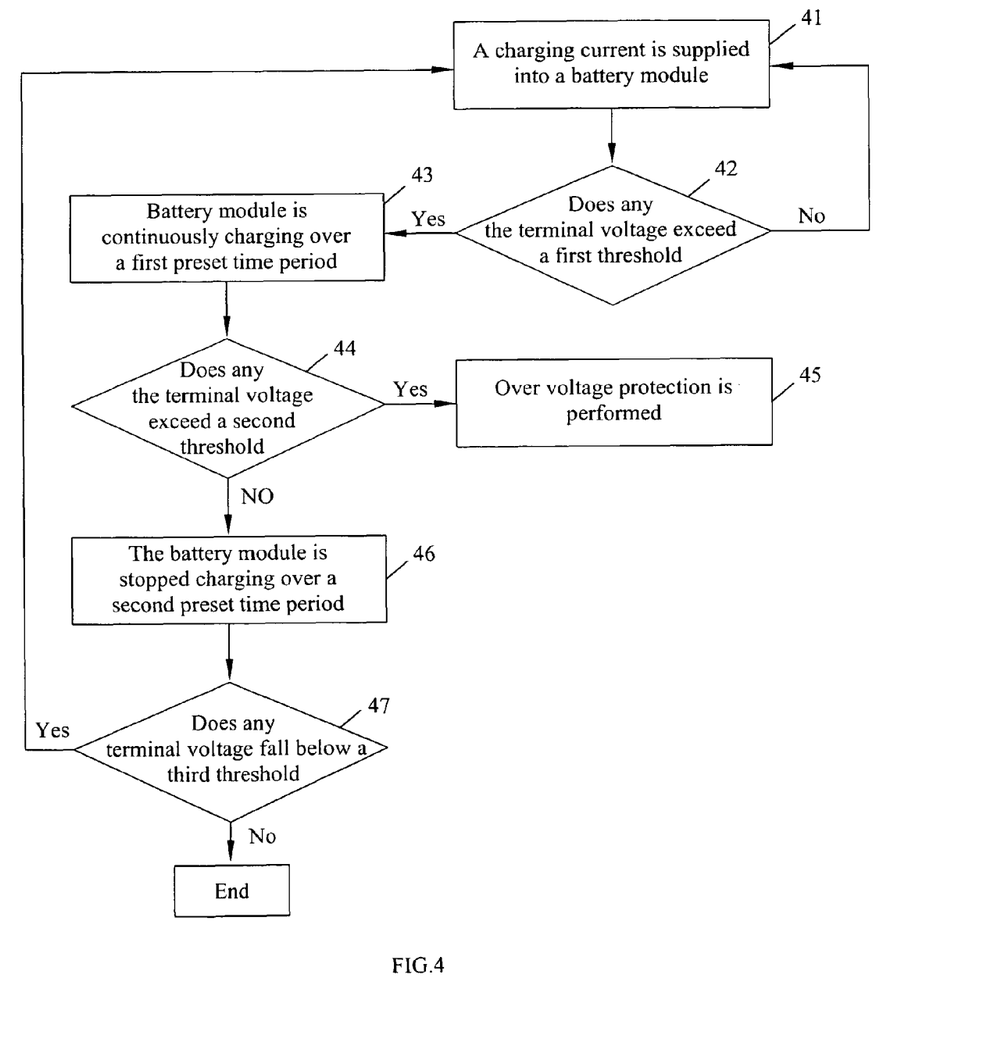
FIG. 4 is a flow chart of first embodiment of the battery charging method in accordance with the present invention.

FIG. 4 illustrates a flow chart of first embodiment of the battery charging method in accordance with the present invention. The method includes the following steps. In step 41 a charging current is supplied into a battery module having a plurality of cell blocks for charging. In step 42 the terminal voltages of the cell blocks is detected for determining whether or not one of the terminal voltages exceeds a first threshold. If no terminal voltage exceeds a first threshold, then step 41 is proceeded.

If one of the terminal voltages exceeds a first threshold, the battery module is continuously charging over a first preset time period in step 43, and then the terminal voltages of cell blocks are determined whether or not one of the terminal voltages exceeds a second threshold in step 44. If one of the terminal voltages exceeds a second threshold, it indicates that one of the cell blocks is deteriorated, such that the over voltage protection is performed in step 45 to avoid risks.

If no terminal voltage exceeds the second threshold, the battery module is stopped charging over a second preset time period in step 46, and then in step 47, the terminal voltages of the cell blocks are determined whether or not one of the terminal voltages falls below a third threshold, if yes, step 41 is proceeded, otherwise, the process ends.

The step 41 is for determining if the battery module is deteriorated, and the step 46 and 47 are for determining if these cell blocks are fully charged. It is to be understood that the means for determining the charging status of cell blocks are not limited to these two steps, and that various other changes and modifications may be included in battery charging management method by one skilled in the art without departing from the scope or spirit of the invention.

For example, in step 47 the terminal voltages of the cell blocks are determined whether or not one of the terminal voltages falls below the third threshold, if yes, it indicates that the cell blocks are not fully charged, otherwise, the cell blocks are fully charged.

Please note, in the aforementioned embodiment, detection of the terminal voltages of cell blocks includes detection of the voltage difference between two terminals of cell block, or detection of voltage of the separate terminal and difference of these voltages is calculated by an additional circuit. Both detecting methods fall within the scope of the appended claims of the present invention.

Figure 5:
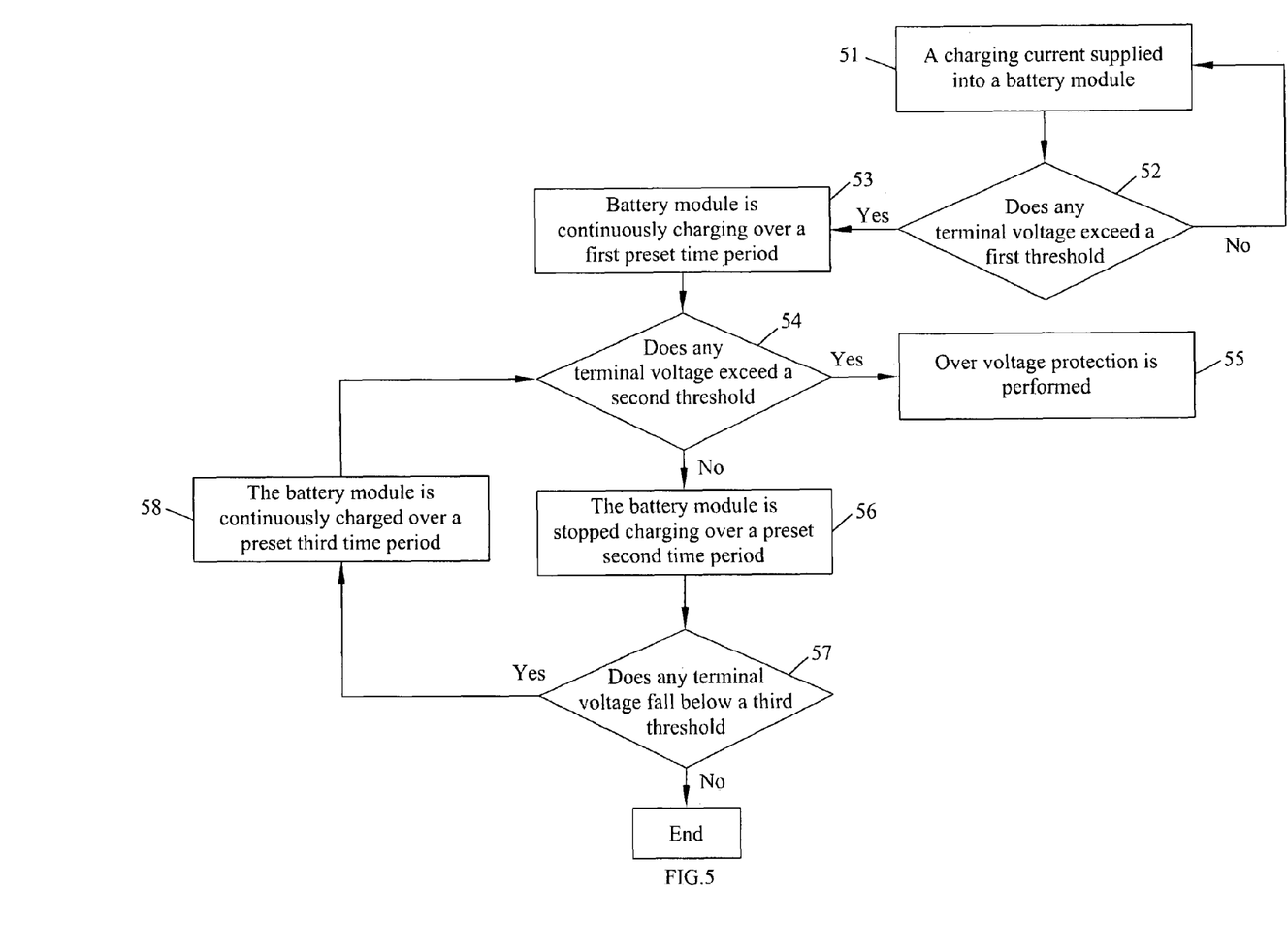
FIG. 5 is a flow chart of second embodiment of the battery charging method in accordance with the present invention.

FIG. 5 illustrates a flow chart of second embodiment of the battery charging method in accordance with the present invention. The method includes the following steps. In step 51 a charging current is supplied into a battery module having a plurality of cell blocks for charging. In step 52 the terminal voltages of the cell blocks are detected for determining whether one of the terminal voltages exceeds a first threshold. If no terminal voltage exceeds the first threshold, the step 51 is proceeded.

If one of terminal voltage exceeds the first threshold, the cell blocks are continuously charged over a first preset time period in step 53, and then in step 54, terminal voltages are determined whether or not one of them exceeds a second threshold, if yes, an over voltage protection is performed in step 55, in which at least one cell blocks is determined to be deteriorated, such that the over voltage protection is performed to avoid risks.

If no terminal voltage exceeds the second threshold, the battery module is stopped charging over a preset second time period in step 56, and then in step 57, the terminal voltages are determined whether or not one of them falls below a third threshold, if not, it indicates that the battery module is fully charged, so charging can be stopped.

If one of terminal voltages falls below a third threshold, the battery module is continuously charged over a preset third time period in step 58, and then the step 54 is proceeded.

The step 51 is for determining if the deteriorated cell block exist among the cell blocks, and step 56 and 57 are for determining if these cell blocks are fully charged. It is to be understood that the means for determining the charging status of cell blocks are not limited to these two steps, and that various other changes and modifications may be included in battery charging management method by one skilled in the art without departing from the scope or spirit of the invention.

Figure 6:
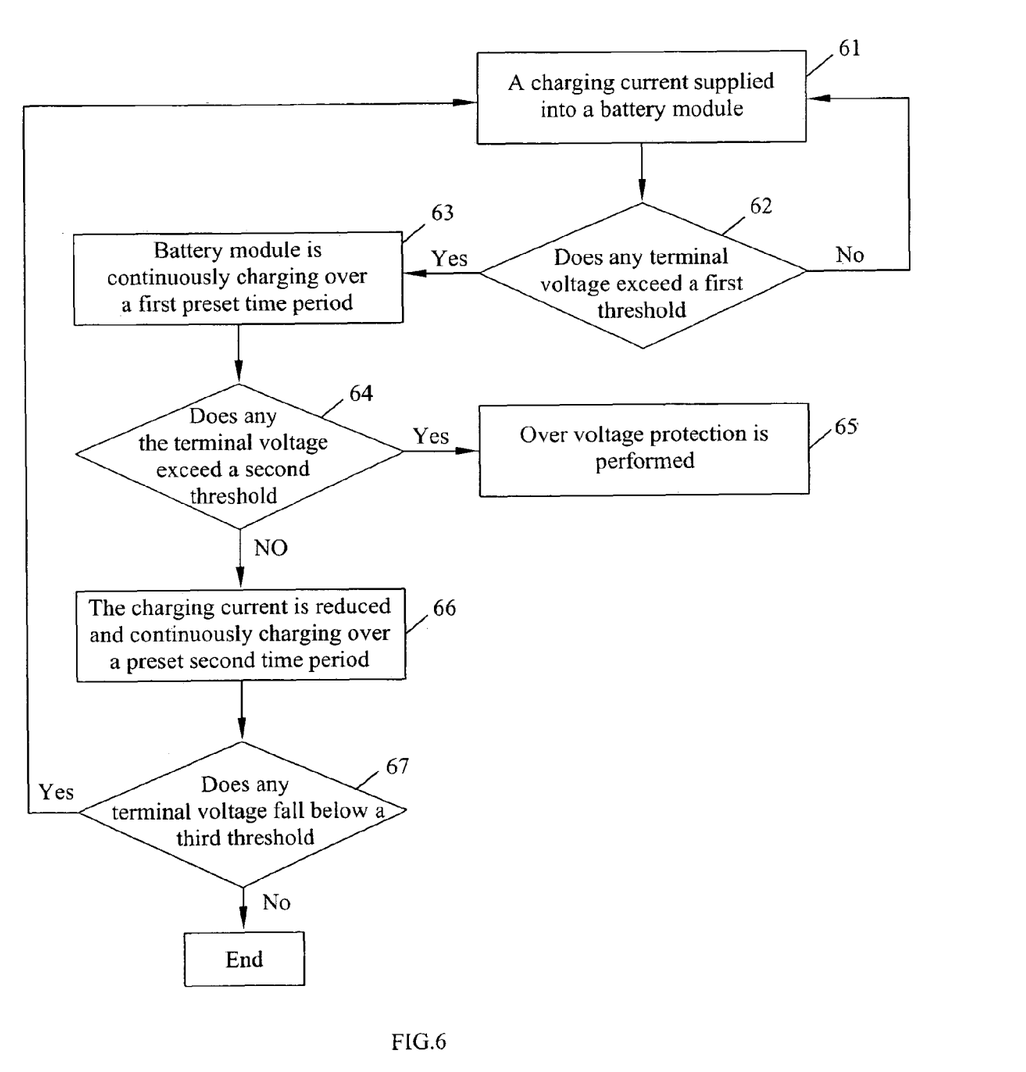
FIG. 6 is a flow chart of third embodiment of the battery charging method in accordance with the present invention.

FIG. 6 illustrates a flowchart of third embodiment of the battery charging method in accordance with the present invention. The method includes the following steps. In step 61 a charging current is supplied into a plurality of cell blocks of a battery module for charging. In step 62 the terminal voltages of the cell blocks are determined whether or not one of terminal voltages exceeds a first threshold. If no terminal voltage exceeds a first threshold, then the step 61 is proceeded.

If one of terminal voltages exceeds the first threshold, the battery module is continuously charged over a first preset time period in step 63, and then in step 64 the terminal voltages are determined whether or not one of them exceeds a second threshold, for determining if deteriorated cell blocks exist among cell blocks. If one of terminal voltages exceeds a second threshold, it indicates that the battery module is determined having deteriorated cell blocks among normal cell blocks, so an over voltage protection (OVP) is performed to avoid risks in step 65.

If no terminal voltage exceeds a second threshold, the charging current is reduced and the reduced charging current is continuously supplied into the battery module for charging over a preset second time period in step 66, and then in step 67, the terminal voltages are determined whether or not one of them falls below a third threshold, if yes, it indicates that the battery module is not fully charged so step 61 is proceeded again. If no terminal voltage falls below the third threshold, it indicates that the battery module is fully charged and the process can end.

The step 61 is for determining if these cell blocks are deteriorated. The step 64 is for determining whether or not a deteriorated cell block exists in a battery module. If one of terminal voltage is greater than the second preset threshold, it indicates that a deteriorated cell block exists in a battery module, so an over voltage protection is performed. The step 66 is for reducing the charging current to reduce the input power, which may decrease the increment of terminal voltages of cell blocks, such that the battery module can be prevented from damaging due to high voltage pressure, so as to make the terminal voltages of cell blocks stable, that is, to eliminate virtual voltage effect as well as to stable the chemical reaction within cell blocks. The step 67 is for determining whether or not battery module is fully charged. if the terminal voltages of cell blocks fall below a preset third threshold, it indicates that the battery module is not fully charged, so again to continuously supply a charging current, otherwise, the battery module is fully charged.

The step 66 and 67 are for determining whether these cell blocks are fully charged. It is to be understood that the means for determining the charging status of cell blocks are not limited to these two steps, and that various other changes and modifications may be included in battery charging management method by one skilled in the art without departing from the scope or spirit of the invention.

Please note, in the aforementioned embodiment, detection of the terminal voltages of cell blocks includes detection of the voltage difference between two terminals of cell block, or detection of voltage of the separate terminal and difference of these voltages is calculated by an additional circuit. Both detecting methods fall within the scope of the appended claims of the present invention. The means of adjusting the charging current may adopt the control module to control the charging module for adjusting charging current, it is to be understood that the means for adjusting the charging current are not limited thereto, and that various other changes and modifications may be included by one skilled in the art without departing from the scope or spirit of the invention.

Please note, in the aforementioned embodiment of the battery charging device, the voltage detection is conducted at terminals of each individual cell block, but is not limited thereto. Namely, by grouping cell blocks, the control module within battery charging device may detect the terminal voltages of the cell blocks, if the terminal voltages are greater than the second threshold, the grouped cell blocks within the cell blocks are determined as deteriorated cell blocks.

Figure 7:
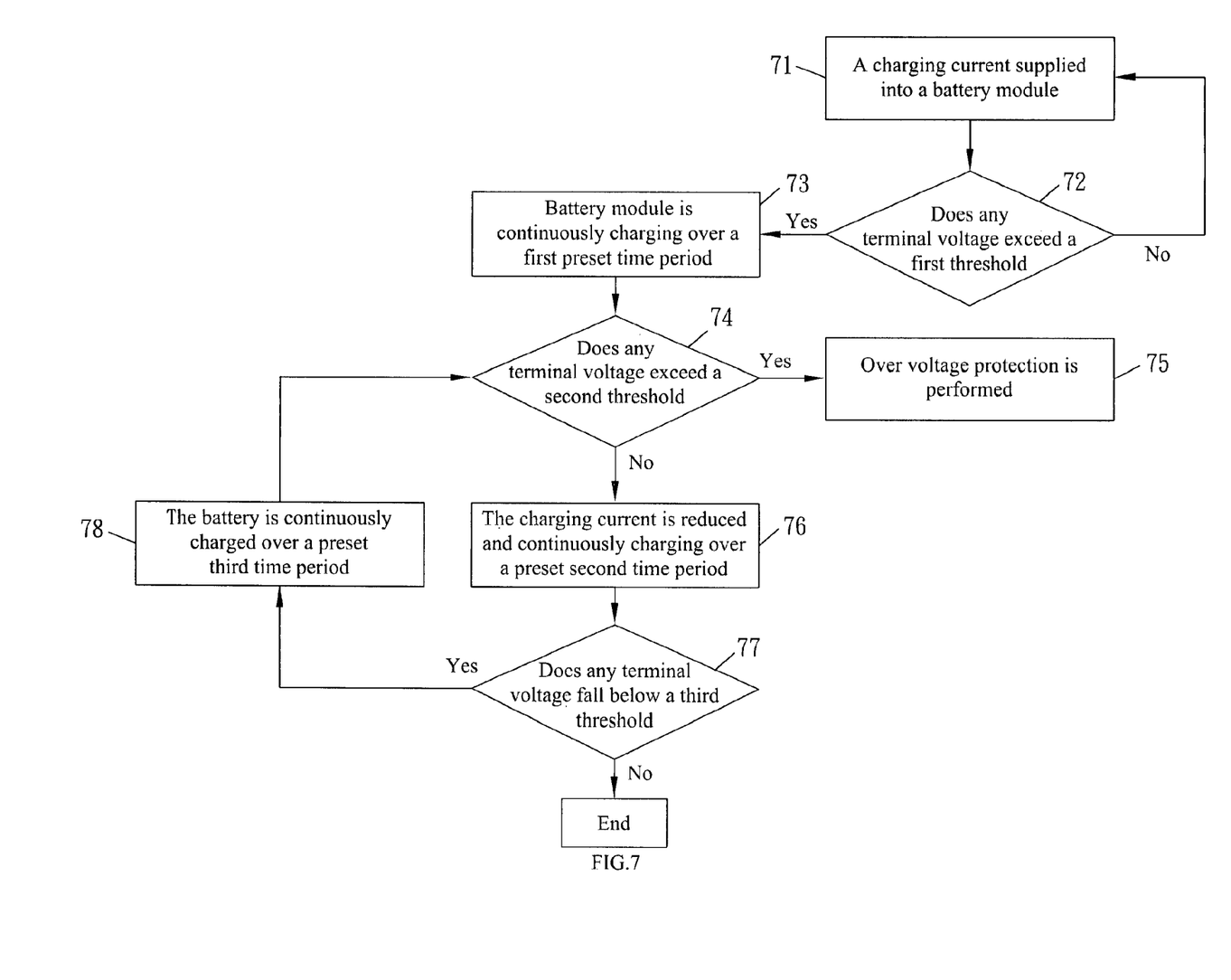
FIG. 7 is a flow chart of forth embodiment of the battery charging method in accordance with the present invention.

FIG. 7 illustrates a flow chart of another embodiment of the battery charging method in accordance with the present invention. The method includes the following steps. In step 71, a charging current is supplied into a battery module having a plurality of cell blocks for charging, and the terminal voltages of the cell blocks are detected and determined whether one of the terminal voltages exceeds a first threshold in step 72, if not, step 71 is performed and a charging current is supplied continuously for charging the battery module.

If one of the terminal voltages exceeds a first threshold, the battery module is continuously charged over a first preset time period in step 73, and then the terminal voltages are determined whether one of them exceeds a second threshold in step 74. If one of them exceeds the second threshold, it indicates that the deteriorated cell blocks exist among normal cell blocks, so the over voltage protection (OVP) is performed to avoid risks in step 75.

If no terminal voltage exceeds the second threshold, the charging current is reduced and the reduced charging current is supplied continuously to charge the battery module over a preset second time period in step 76, and then the terminal voltages are determined whether or not one of the them falls below a third threshold in step 77, if not, it indicates that the battery module is fully charged, so the process ends.

If one of them falls below the third threshold, it indicates that the battery module is not fully charged, so in step 78 the battery is continuously charged over the preset third time period, and the step 74 is performed again.

The step 71 is for determining whether or not these cell blocks are deteriorated, the step 74 is for determining whether or not there is deteriorated cell blocks in a battery module. The step 76 is for reducing the charging current to eliminate virtual voltage effect as well as to stable the chemical reaction within cell blocks. Step 77 is for determining if battery module is fully charged, the battery module is not fully charged if the terminal voltages of cell blocks fall below the preset third threshold, otherwise, it is fully charged.

The step 76 and 77 are for determining if these cell blocks are fully charged. It is to be understood that the means for determining the charging status of cell blocks are not limited to these two steps, and that various other changes and modifications may be included in battery charging management method by one skilled in the art without departing from the scope or spirit of the invention.

While the present invention has been described with reference to the preferred embodiments, it is intended that the invention be not limited by any of the details of the description therein but includes all the embodiments which fall within the scope of the appended claims.

What is claimed is:

1. A battery charging method including the steps of:
   (a) supplying a charging current into a battery module having a plurality of cell blocks for charging;
   (b) detecting the terminal voltages of said cell blocks;
   (c) continuously charging over a first preset time period if one of said terminal voltages exceeds a first threshold;

(c') determining whether or not one of said terminal voltages of said cell blocks exceeds a second threshold, and performing step (d) if one of said terminal voltages of said cell blocks exceeds said second threshold, otherwise performing step (e);

(d) performing an over voltage protection; and (e) determining whether or not said cell blocks are fully charged, and stopping charging if said cell blocks are fully charged, otherwise performing step (a) or step (c').

2. The battery charging method of claim 1, wherein the step (e) further includes sub-steps of:

stopping charging said battery module over a second preset time period; and determining whether or not one of said terminal voltages falls below a third threshold, wherein said cell blocks are determined being not fully charged if one of said terminal voltages falls below a third threshold, otherwise, said cell blocks are determined being fully charged.

3. The battery charging method of claim 1, wherein said first threshold is smaller than the voltage value in which said cell block is fully charged.

4. The battery charging method of claim 1, wherein the second threshold is greater than the voltage value in which said cell block is fully charged.

5. The battery charging method of claim 2, wherein the step (e) further includes including a sub-step of:

continuously charging over a third preset time period if said cell blocks are determined being not fully charged.

6. A battery charging method including the steps of:

(a) supplying a charging current into a battery module having a plurality of cell blocks for charging;

(b) detecting the terminal voltages of said cell blocks;

(c) continuously charging over a first preset time period when one of said terminal voltages exceeds a first threshold;

(c') determining whether or not one of said terminal voltages of said cell blocks exceeds a second threshold, and performing step (d) if one of said terminal voltages of said cell blocks exceeds a second threshold, otherwise, performing step (e);

(d) performing an over voltage protection;

(e) reducing the charging current and continuously supplying reduce charging current over a second preset time period; and (f) determining whether or not said cell-blocks are fully charged, and stopping charging if said cell-blocks are determined being fully charged; otherwise, performing step (a) or step (c').

7. The battery charging method of claim 6, wherein the step (f) further includes a sub-step of:

determining whether one of the terminal voltages falls below a third threshold, wherein said cell blocks are determined being not fully charged if one of the terminal voltages falls below a third threshold, otherwise, said cell blocks are determined being fully charged.

8. The battery charging method of claim 6, wherein the first threshold is smaller than the voltage value in which said cell blocks are fully charged.

9. The battery charging method of claim 6, wherein the second threshold is greater than the voltage value in which said cell blocks are fully charged.

10. The battery charging method of claim 7, wherein the step (f) further includes a sub-step of:

continuously charging over a third preset time period if said cell blocks are determined being not fully charged.

11. A battery charging device, applied for a battery module having a plurality of cell blocks, said battery charging device comprising:

a charging module for supplying a charging current into said cell blocks;

an over voltage protection module for providing an over voltage protection function to said cell blocks; and a control module for detecting the terminal voltages of said cell blocks, when one of said terminal voltages exceeds a first threshold, said control module continuously supplying said charging current into said battery module over a first preset time period, and then determining whether or not one of said terminal voltages of said cell blocks exceeds a second threshold.

12. The battery charging device of claim 11, wherein said control module enables said over voltage protection module to provide said voltage protection function if the control module determines that one of said terminal voltages of said cell blocks exceeds said second threshold after said first preset time period.

13. The battery charging device of claim 11, wherein said control module controls said charging module to reduce said charging current and continuously supplying said reduced charging current over a second preset time period if said control module determines one of terminal voltages of the cell blocks falls below said second threshold after said first preset time period.

14. The battery charging device of claim 13, wherein said control module determines whether or not one of said cell blocks falls below said third threshold after said charging module charges said battery module over said second preset time period, and said control module determines that cell blocks are not fully charged if one of said cell blocks falls below said third threshold, otherwise, said control module determines that cell blocks are fully charged.

15. The battery charging device of claim 11, wherein said charging device further comprises an built-in memory for storing said first threshold, said second threshold, said third threshold, said first preset time period and said second preset time period.

16. The battery charging device of claim 11, wherein said control module comprises a counter to calculate said preset time periods.

17. The battery charging device of claim 11, wherein said first threshold is smaller than the voltage value in which said cell blocks are fully charged.

18. The battery charging device of claim 11, wherein said second threshold is greater than the voltage value in which said cell blocks are fully charged.

* * * * *